United States Patent [19]
Lovejoy

[11] 3,978,186
[45] Aug. 31, 1976

[54] METHOD FOR MAKING A PARTITIONED CONTAINER

[75] Inventor: Walter R. Lovejoy, Elmhurst, Ill.

[73] Assignee: Beatrice Foods Co., Chicago, Ill.

[22] Filed: Nov. 19, 1975

[21] Appl. No.: 633,496

Related U.S. Application Data

[63] Continuation of Ser. No. 526,977, Nov. 25, 1974, abandoned, which is a continuation of Ser. No. 219,637, Jan. 21, 1972, abandoned, which is a continuation-in-part of Ser. No. 883,010, Dec. 8, 1969, which is a continuation-in-part of Ser. No. 821,238, May 2, 1969, Pat. No. 3,568,973.

[52] U.S. Cl. .............................. 264/102; 264/328; 264/329; 264/334
[51] Int. Cl.² .......................................... B29F 1/14
[58] Field of Search ............ 264/328, 329, 102, 334

[56] References Cited
UNITED STATES PATENTS

| | | | |
|---|---|---|---|
| 2,542,263 | 2/1951 | Schultz | 264/327 |
| 2,799,435 | 7/1957 | Abplanalp | 264/328 X |
| 3,309,451 | 3/1961 | Holtzman | 264/327 X |
| 3,475,530 | 10/1969 | Cooper | 264/327 X |
| 3,568,973 | 3/1971 | Rau | 425/242 |
| 3,673,302 | 6/1972 | Halsall | 264/328 |

*Primary Examiner*—Richard R. Kucia
*Attorney, Agent, or Firm*—Hosier & Niro, Ltd.

[57] ABSTRACT

Methods are disclosed for injection molding a partitioned container having four sidewalls, an open top and a closed bottom. Thermoplastic material from a primary sprue flows through a runner system to inlet gates disposed to open into the mold cavity in a generally common plane lying at about the open top of the container to be molded and along opposed container sidewalls intermediate adjacent partition walls. Two mold structures for, inter alia, facilitating the gating method are disclosed. A preferred mold comprises four block members defining, in a closed position, a hollow cavity corresponding to the exterior container dimensions but moveable outwardly to an open position. A plurality of spaced core members are moveable into and out of the hollow cavity to, respectively, define the container mold and permit ejection of the molded container therefrom. Other method features are disclosed.

15 Claims, 15 Drawing Figures

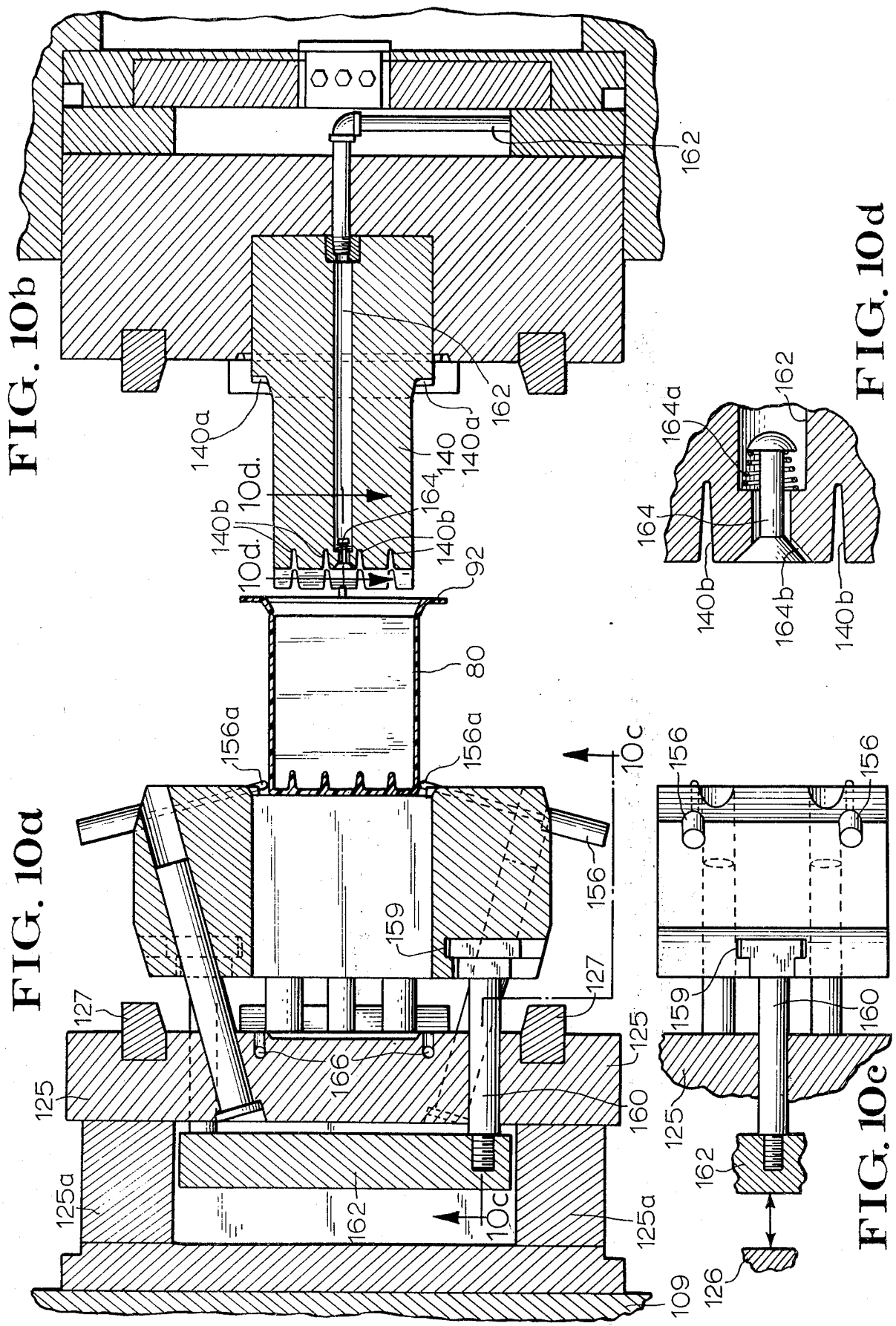

METHOD FOR MAKING A PARTITIONED CONTAINER

CROSS-REFERENCE TO RELATED APPLICATION

The present application is a continuation of application Ser. No. 526,977, filed Nov. 25, 1974 now abandoned, which is, in turn, a continuation of application Ser. No. 219,637 filed Jan. 21, 1972, now abandoned which is, in turn, a continuation-in-part of application Ser. No. 883,010 filed Dec. 8, 1969, which, in turn, is a continuation-in-part of application Ser. No. 821,238 filed May 2, 1969, now Pat. No. 3,568,973 issued to Rau et al.

INTRODUCTION

The present invention relates generally to methods for manufacturing partitioned containers, such as battery casings or the like. More particularly, the invention is directed to new improved methods for injection molding such containers.

BACKGROUND OF THE INVENTION

A frequent problem in producing thermoplastic molded articles of complex geometry is the unevenness of flow of the molded plastic into the mold resulting in poor quality in the finished product and difficulty in releasing the product from the mold. This is particularly so in the molding of partitioned container-like devices, such as battery casings, where the uneven flow of thermoplastic material into the mold cavity can, for example, cause unequal pressure distribution on opposite sides of the core elements in the mold defining the partitions. This, in turn, causes shifting of the cores and, ultimately, varying wall thicknesses in the molded product.

Another problem is the complexity and expense of manufacture of the mold structure used for making such containers. Also, removal of the molded part from the mold cavity is a further problem.

SUMMARY OF THE INVENTION

The present invention provides a mold structure of a simple and economical construction that materially alleviates the aforenoted problems of the prior art.

In accordance with the invention, there is provided a novel method of gating an injection mold structure of a type comprising a pair of separable mold members cooperating to define a mold cavity for manufacture of a container of a rectangular box-like configuration having a closed bottom wall and an open top and further having a plurality of partition walls extending between spaced casing sidewalls and dividing the casing into a plurality of cells. Specifically, the method comprises the steps of injecting thermoplastic material into the mold structure through a primary inlet sprue. The thermoplastic material is communicated to cold runner channel means through hot runner channel means that are coupled to the inlet sprue. The thermoplastic material is introduced into the mold cavity through a plurality of inlet gates coupled to the cold runner means and disposed in a generally common plane lying adjacent the plane formed by that portion of the mold structure corresponding to the open top of the casing. Preferably, the gates are disposed in the common plane so as to open into the mold cavity at spaced intervals corresponding in location to the opposite sidewalls of the casing and intermediate respective adjacent pairs of partition walls.

An injection mold structure in accordance with the invention comprises a first mold means having four sidewalls and a transverse end wall defining a rectangular mold cavity conforming to the desired exterior dimensions of the container. A second mold means comprises a transverse end wall spaced from and parallel to the transverse end wall of the first mold means and moveable relative to the first mold means. The second mold means further includes a plurality of core elements affixed to one of the transverse end walls for defining, in conjunction with the first mold means and the transverse end wall of the second mold means, a mold cavity corresponding to the container. There are also provided gating means including a primary inlet sprue coupled to a plurality of inlet gates to the mold cavity, the inlet gates being positioned in a generally common plane adjacent the transverse end wall of the mold cavity corresponding to the open top of the container and spaced about the perimeter of the mold cavity for introducing thermoplastic material into the mold cavity to form the container.

Other aspects and features of the methods of the present invention are disclosed in claims later herein.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIGS. 10a and 10b are side elevational views, in section, of the mating mold members taken along lines 10a—10a and 10b—10b of FIGS. 8 and 9, respectively;

FIG. 10c is a sectional view taken along lines 10c—10c of FIG. 10a ; and

FIG. 10d is an exploded, detail view of one structural features of the mold taken along lines 10d—10d of FIG. 10b.

DESCRIPTION OF THE PREFERRED EMBODIMENTS

Figure 1:
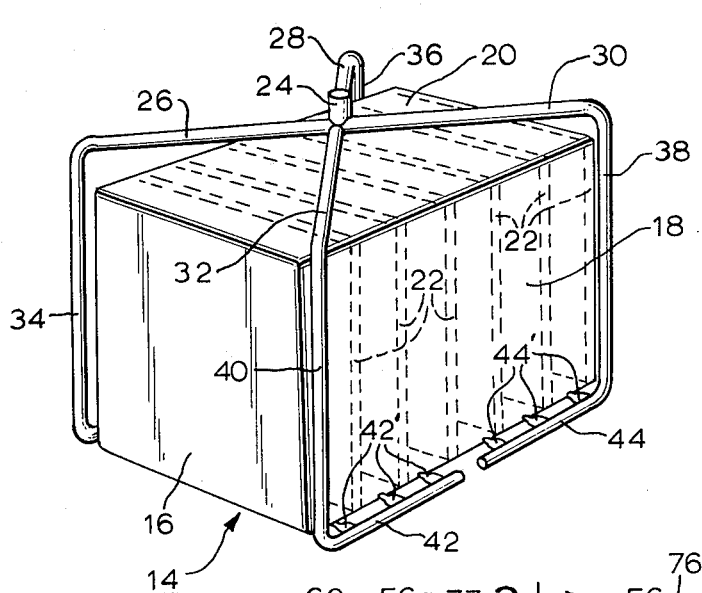
FIG. 1 illustrates, in semi-schematic fashion, an exemplary partitioned container and one gating method according to the invention for injection molding the illustrated container.

Referring now to FIG. 1, there is schematically illustrated a partitioned container 14 as well as one technique for gating the container in accordance with the method of the present invention. The partitioned container 14 which may be a plastic battery casing or the like is of a rectangular, box-like configuration having four sidewalls, two of which 16 and 18 are visible in the drawing. The casing also includes a closed bottom wall 20 and an open top (not visible in the drawing) as well as a plurality of equally spaced internal partition walls 22 seen in phantom outline in the drawings. Partition walls 22 extend between sidewall 18 and the opposite parallel sidewall, not visible in the drawing.

In terms of gating, the flow path of the molten thermoplastic material from a source point or primary inlet sprue 24, through the mold structure to be described and into the mold cavity is depicted schematically in FIG. 1 by tubular channels or "streams". Specifically, molten thermoplastic materials flows horizontally from the source point 24 in four mutually perpendicular directions, each parallel to bottom wall 20 and each directed toward a respective one of the four corners of the casing as shown by the four streams or channels 26, 28, 30 and 32. Beyond the corners of the battery casing 14, the aforesaid four channels turn downwardly to form four vertical channels 34, 36, 38 and 40 that extend vertically adjacent the vertical edges of the four sidewalls of the casing. As will presently be seen, the four horizontal channels 26, 28, 30 and 32 form a hot runner system wherein the thermoplastic material is always maintained in a melt whereas the vertical extensions 34, 36, 38, and 40 of these channels form the initial part of a cold runner channel system wherein the thermoplastic material solidifies on each "shot" and must be removed from the mold structure along with the container on each injection molding cycle.

Each of the four vertical channels 34, 36, 38 and 40 connects at the lower end of the cavity to a horizontal runner, only two of such runners 42 and 44 being visible in FIG. 1. The runners 42 and 44 are identical to their counterparts not visible in the drawing and include respective pluralities of gate inlets 42' and 44' positioned intermediate adjacent pairs of partitioned walls 22 for introducing the molten thermoplastic material into the mold cavity.

Figure 3:
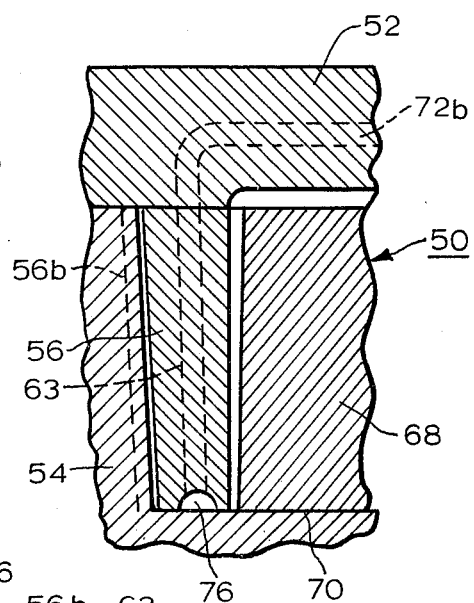
FIG. 3 is a fragmentary sectional view taken along lines 3—3 of FIG. 2.
Figure 2:
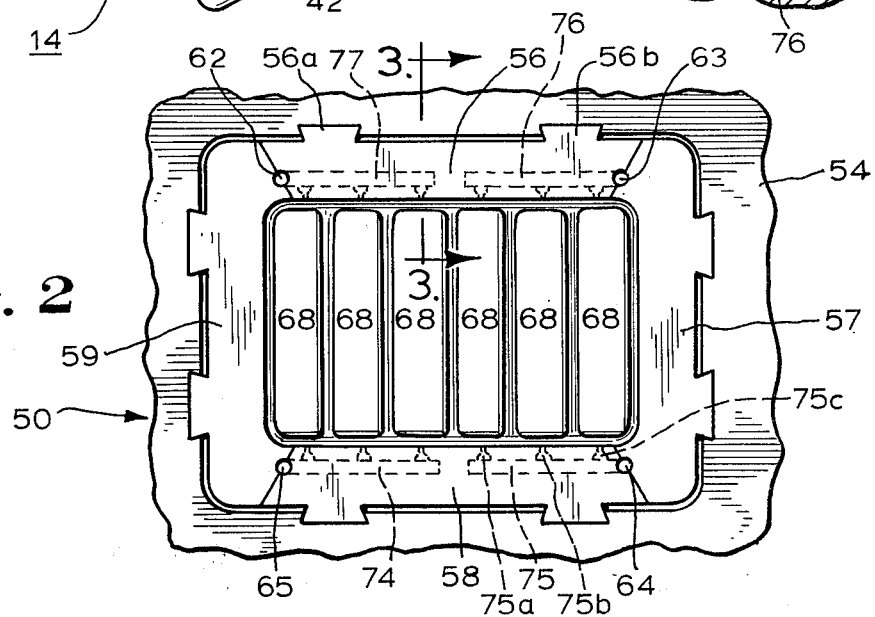
FIG. 2 is a plan view of a lower mold platen of a mold structure employing the gating method of FIG. 1.
Figure 4:
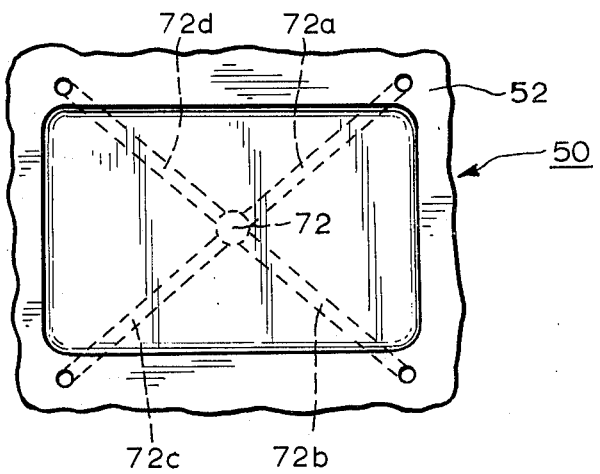
FIG. 4 is a plan view of an upper mold platen adapted for mating with the lower mold platen of FIG. 2 to form a complete mold structure.

Referring now to FIGS. 2–4, the mold apparatus 50 there illustrated comprises an upper mold platen 52 and a mating lower mold platen 54, the platen 54 being provided with a rectangular mold cavity defined by four wedge shaped sidewall members 56–59 inclusive. The sidewall members 56–59 are slidably mounted in the lower mold platen 54 by means of mating dove tail members, as exemplified by the dove tails 56a and 56b which interlock the sidewall member 56 for slidable movement relative to the lower mold platen 54. The sidewall members reciprocate in unison between a closed position illustrated in the drawings and wherein the four sidewalls cooperate to define a hollow, rectangular enclosure conforming to the desired exterior dimensions of the mold cavity and an open position (not shown) wherein the sidewall members are slid upwardly and partially out of the lower mold platen 54.

The sliding movement of the sidewall members to their open position also results in these members being displaced laterally outward one from the other by reason of the wedge shaped cross-section of these members and the complementary contour of the mating sidewalls of the mold platen 54. Specifically, as illustrated in FIG. 3, the typical sidewall member 56 tapers in thickness from its top to its bottom while the associated sidewall of the mold platen 54 slopes inwardly so as to maintain the inner surface of the sidewall member 56 in a vertical plane. The slidable sidewall members enhance removal of the finished molded casing from the mold apparatus, as will presently be explained.

The mitred corners formed between respective pairs of the sidewall members 56–59 are provided with mated grooves defining four vertical passages or channels 62–65. The passageways 62–65 form flow channels for the respective liquid streams denoted schematically by the numerals 34, 36, 38 and 40 in FIG. 1.

The lower mold platen 54 also includes a plurality of rectangular core elements 68 positioned in fixed engagement with a transverse bottom wall 70 of the mold platen 54 and in predetermined base relation to one another. The core elements 68 in cooperation with the hollow rectangular cavity formed by the four sidewalls 56–59 defined an open ended, box-like mold cavity having a plurality of partitioned cavities each communicating with the surrounding box-like cavity. The core elements 68 may be recessed below the transverse face of platen 52 by a distance corresponding to the desired thickness of the bottom wall 20 of the battery casing 14, or, alternatively, the face of platen 52 may be formed with a sculptured or recessed surface as seen in FIG. 3.

The gating of the mold structure may be appreciated in further detail by reference to FIGS. 3 and 4. Specifically, molten thermoplastic material from a supply source (not shown) is introduced through a single primary inlet sprue 72 (FIG. 4) formed as an inlet bore to upper mold platen 52. Sprue 72 connects to four horizontal passageways 72a-d; these passages in turn connect to respective ones of the vertical cold runner passages 62–65, visible in FIG. 2. Vertical passages 62–65 are in turn connected to respective horizontal cold runner passages 74–77, seen in phantom outline in FIG. 2, and which extend laterally adjacent the mold sidewalls at that end of the mold cavity defining the open end of the container 14 to be formed. Cold runner passages 74–77 are defined by grooves formed on the underside of the sidewall members as are the three inlet gates to the mold cavity which connect to each of the runners 74–77. As shown, the inlet gates, exemplified by the three gates 75a-c of runner 75, are preferably positioned intermediate adjacent mold partitioned cavities.

In forming a molded device utilizing the embodiment of the mold structure shown in FIGS. 1–4, the mold platens 52 and 54 are placed in a mating relation or closed relation by means of a conventional hydraulic press (not shown) and molten thermoplastic material is introduced through primary inlet sprue 72. From sprue 72, the molten plastic is carried through horizontal hot runner passages 72a-d and respective cold runner vertical passages 62–65 to cold runner segments 74–77, respectively. The thermoplastic material then enters the mold cavity through the various inlet gates of each segment 74–77 and as exemplified by gates 75a-c of segment 75.

The thermoplastic material flows into all portions of the battery casing mold and solidifies thereby forming a molded battery casing 14. The plastic material remaining in the cold runner passages 62–65, and their associated cold gate inlets also solidifies due to the lack of heating elements in lower mold platen 54. Conventional heating elements forming part of upper mold platen 52 (not shown) keep the thermoplastic material in sprue 72 and horizontal channels 72a-d in a liquid state. A ring of waste material is formed along with the battery casing 14 conforming to vertical passages 62–65, horizontal passages 74–77 and the cold gate inlets. This waste ring is ultimately broken off from casings 14 and discarded or melted down and reused to form other casings.

The removal or ejection of the molded battery casing 14 from the mold cavity is effected by reverse movement of the hydraulic press which, as previously mentioned, serves to clamp the opposing mold platen 52 and 54 in a closed position during each injection cycle. The hydraulic press and related mold structure not illustrated in detail in FIGS. 1–1 may be conventional. Furthermore, suitable forms of such structure are disclosed in the earlier cited parent application and later herein. Ejection rods also not shown are moved upwardly from the underside of the platen 54 to engage the narrow base of each of the sidewall edges 56–59 thereby to move the sidewalls in unison upwardly and partially out of the platen 54. As previously mentioned, the tapered contour of the sidewalls and the complementary contour of the surrounding sidewalls of platen 54 assure that the sidewalls move outwardly concurrently with their upward movement. Accordingly, the mitred corners of the sidewall members separate and the sidewalls move outwardly away from the sidewalls of the molded casing. The ejection rods also include a rim portion which engage the peripheral rim of the open top of the molded battery casing 14 and force the battery casing to separate vertically from core members 68. In this regard, the wedge-shaped sidewall members 56–59 initially move upwardly while in firm engagement with the outer surface of the battery casing to assist in breaking loose the molded casing from the core members 68 and then continue to move further upwardly and outwardly to release the undercuts on the molded sidewalls on the casing. Thus, the molded casing 14 and the annexed cold runner material may be withdrawn from the mold cavity conditioning the mold for a successive molding cycle.

Figure 5:
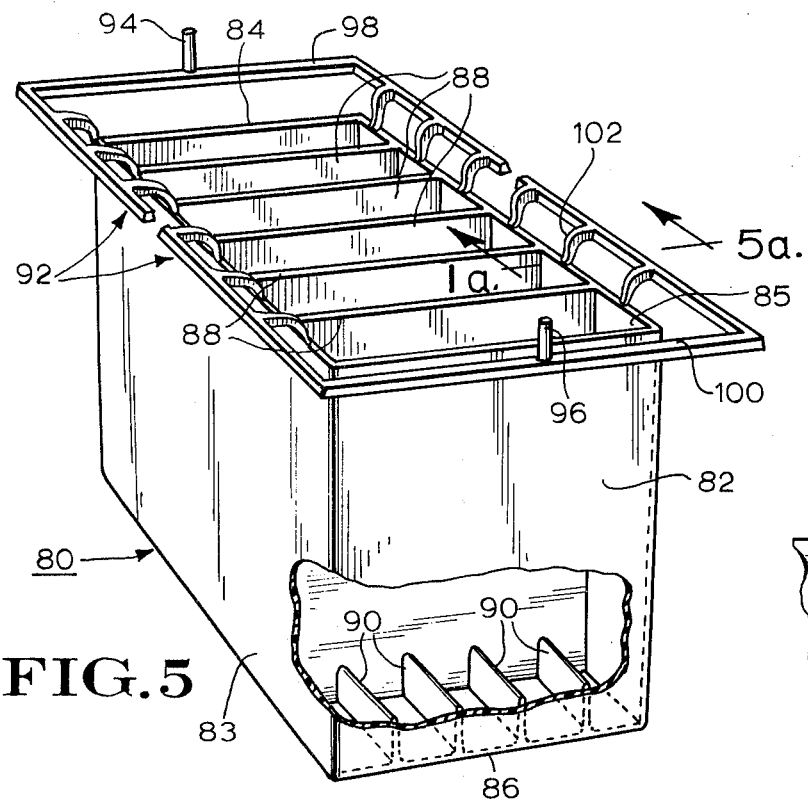
FIG. 5 depicts a partitioned container similar to that of FIG. 1 but having annexed cold runner waste material which serves to illustrate the preferred gating method of the invention for injection molding the container.

Referring now to FIG. 5, there is illustrated a container 80 manufactured according to a preferred method and apparatus of the present invention. The container 80 may be substantially identical to the container 14 of FIG. 1 and like container 14 is of a rectangular, box-like configuration having four sidewalls 82-85. The container 80 further includes a closed bottom wall 86 and an open top through which are visible the upper portions of a plurality of laterally spaced partitioned walls 88. The partition walls 88 extend between the spaced container sidewalls 83 and 85 and serve to divide the container into a plurality of cells. Each cell, like the exemplary cell visible in the drawing, may be provided with a plurality of laterally spaced reinforcing ribs 90 extending across the width of the cell perpendicular to the partition walls 88.

The preferred method of gating a mold cavity to produce the container 80 may be appreciated in at least general terms by consideration of the cold runner waste material that is still affixed to the container 80 adjacent its open top and designated generally in the drawing by the reference numeral 92. As is well known to those skilled in the art, the waste material 92 is formed in the unheated or cold runner portion of the flow path for the thermoplastic material and must be removed from the mold structure along with the molded container on each cycle of operation. Each point of affixation of the cold runner material 92 to the container 80 denotes an inlet gate through which the thermoplastic material is introduced from the cold runner system into the mold cavity.

Thus, as will presently be seen, the molten thermoplastic material is injected into the mold structure through a primary inlet sprue and is maintained in a heated condition until it exits from a pair of secondary sprues into a pair of cold runner inlet channels defined by the vertical cold runner segments 94 and 96 in FIG. 5. The vertical cold runner segments 94 and 96 are connected to the center base portions of a pair of similar U-shaped cold runners 98 and 100. The base portions of the U-shaped cold runners 98 and 100 are parallel to and spaced outwardly from the sidewalls 84 and 82, respectively, of the casing 80. Similarly, the opposed leg portions of the facing U-shaped runners 98 and 100 are parallel to and spaced laterally outwardly from their associated sidewalls 83 and 85. Each of the opposed leg portions of the cold runners 98 and 100 include, in the present embodiment, three laterally spaced gate inlet portions integral with an associated leg of the cold runner and fixed to the container as its open top. An exemplary one of the cold runner inlet gates 102 is illustrated in FIG. 5 and in the exploded detailed view of FIG. 5a.

Figure 5A:
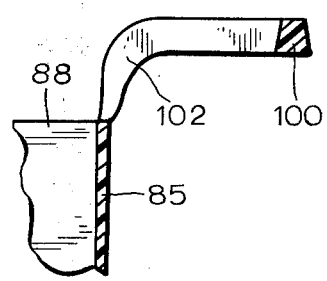
FIG. 5a is an exploded, sectional view taken along lines 5a —5a of FIG. 5.

As may be appreciated from FIGS. 5 and 5a, all of the inlet gates are disposed in a generally common plane about the open top of the container. Furthermore, as is readily visible from the drawing, the cold runner inlet gates connect to the container 80 at spaced intervals along the opposite sidewalls 83 and 85 intermediate respective adjacent pairs of the partitioned walls 88.

Although the U-shaped cold runners 98 and 100 depict the presently preferred arrangement for communicating the thermoplastic material to the individual inlet gates, it will be recognized by those skilled in the art that a variety of other runner means may be used consistent with the more basic concepts of the present invention. Furthermore, it will be recognized that the inlet gates, like gate 102, need not connect directly to the peripheral rim of the open top of container 80 as shown, but may connect to the various container sidewalls. It is important only that gating be accomplished at or near what is to become the open top of the partitioned container.

Figure 6:
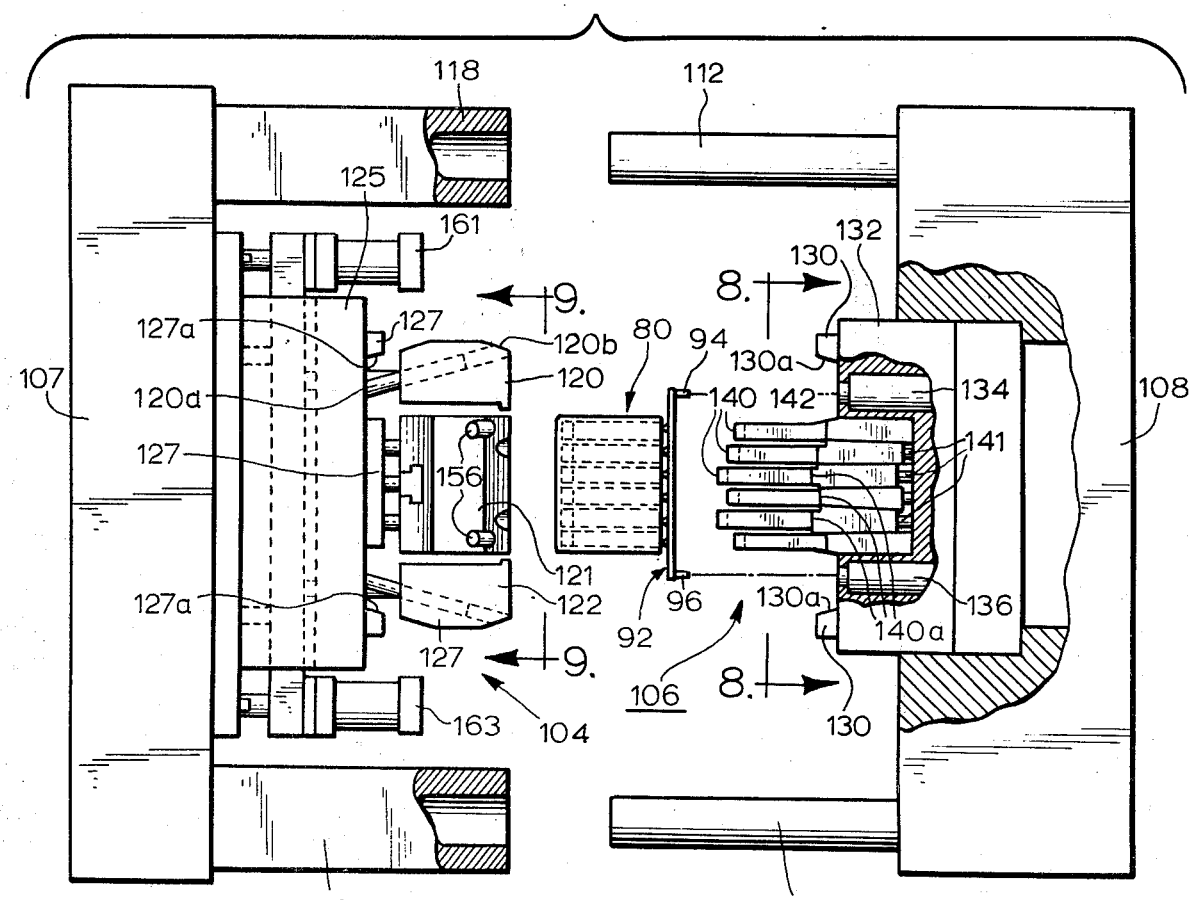
FIG. 6 is a plan view, partly in section of a preferred mold structure according to the teachings of the present invention.

A preferred mold structure facilitating the gating method depicted by FIG. 5 and incorporating a variety of structural features of the invention is illustrated in FIG. 6. The mold structure comprises a first and second mold means generally designated in the drawing by the reference numerals 104 and 106, respectively. The mold means or mold sections 104 and 106 are carried by conventional, respective platens 107 and 108 that form part of a conventional hydraulic or pneumatic press, not shown. As is well understood in the art, the hydraulic press is operative for moving the platens and thus the first and second mold sections 104 and 106 between a closed or mating position wherein the mold sections are in intimate association and an open position as depicted in FIG. 6 in which the mold sections are separated to allow the molded container to be removed from the mold cavity. Proper mating of the mold sections 104 and 106 is assured by the provision of guide means comprising pairs of large guide rods 112 and 114 carried by the platen 106 and complementary guide sleeves 116 and 118 carried by the platen 108.

The first mold means 104 comprises four sidewall members, three of which 120-122 are visible in FIG. 6. All of the sidewalls members 102-123 are visible in FIG. 9. These sidewall members and a first transverse end wall member defined by the adjacent face of a base or support plate 125 cooperate to define a rectangular mold cavity conforming to the desired exterior dimensions of the container 80. The four sidewall members 120-123 are moveable from a closed position in which they are contiguous the face of plate 125 to an open position as shown in FIG. 6 wherein each of the sidewall members 120-123 is displaced away from plate 125 and laterally outward of its closed position. Each of the sidewall members 120-123 is confined to follow a specific path in moving between its open and closed positions by means of pairs of guide posts which ride in complementary bores of each sidewall member. The guide posts and bore arrangement for sidewall member 120 is exemplary of the corresponding structure of the remaining sidewalls and includes the guide post 120a slideably journalled in the complementary sidewall bore 120b. As many best be appreciated by momentary reference to FIG. 7, the exemplary guide post 120a is similar to a large bolt entering the backside of base plate 125 and extending therethrough and into the bore 120a. The post 120a is threadably or otherwise rigidly secured to base plate 125. The other guide post and bore arrangement 120c and 120d, respectively, for sidewall 120 is visible in FIG. 9. The stationary base plate 125 is rigidly secured to a second base plate 126 and in spaced relation thereto by means of spacers 125a, two of which are visible in FIG. 7. The second base plate 126 is in turn removeably bolted to the platen 109. The control mechanism for displacing the sidewall members between their open and closed positions will be explained later herein.

Figure 7:
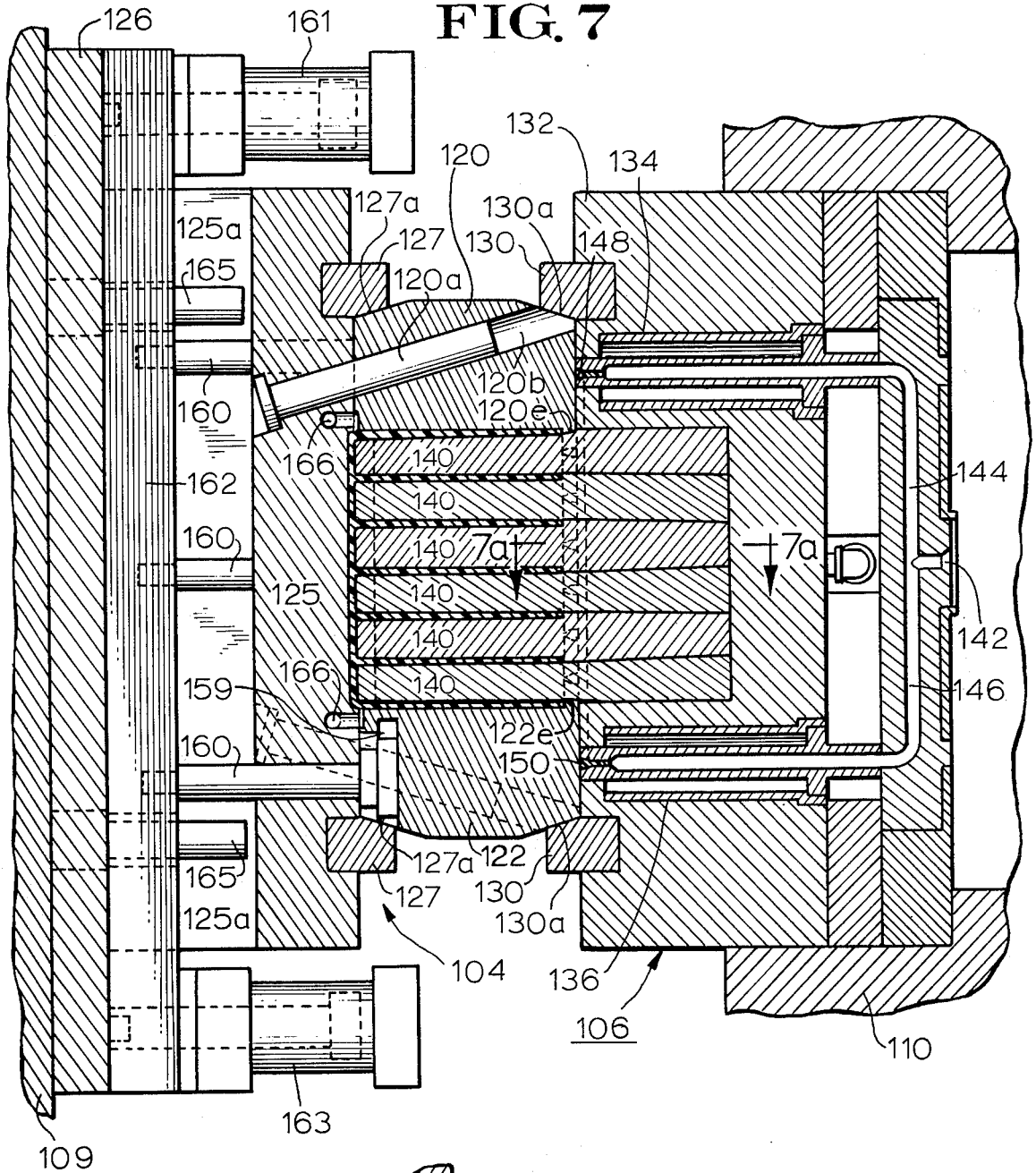
FIG. 7 is a plan, sectional view similar to FIG. 6 but showing the mold structure in a closed position.
Figure 9:
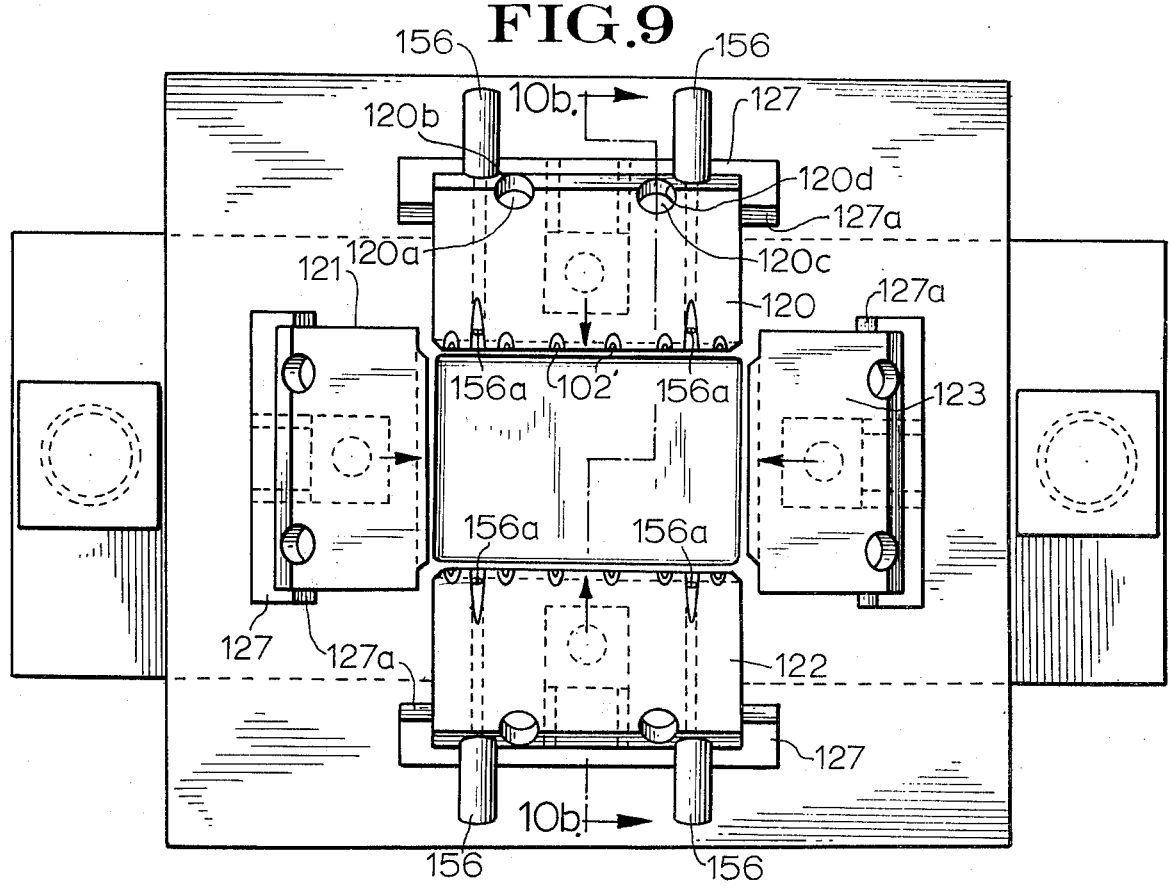
FIG. 9 is a view of the other mating section of the mold structure taken along lines 9—9 of FIG. 6.

It will be recognized that the sidewall members 120-123, unlike the sidewall members of the mold structure of FIG. 2, are not supported within an outer support block. The elimination of this block results in a substantial simplification and economy in construction of the mold. In order to securely retain the sidewall members in proper position under the extreme pressures encountered during injection of a molten thermoplastic material into the mold cavity, the mold structure of the invention includes cam locking means comprising four similar and comparatively small retaining blocks 127 rigidly to secure to base plate 125, as seen in FIGS. 6-7 and 9. Each of the retaining blocks 127 includes a sloped cam face portion 127a which engages a complementary sloped face portion of an associated sidewall member as the sidewall members are moved into their closed position in engagement with the base plate 125. The sidewalls 120 and 122 are shown in FIG. 7 in locked engagement with their associated retaining blocks 127 while in FIG. 6 they are displaced outwardly of the blocks in their open position.

Figure 8:
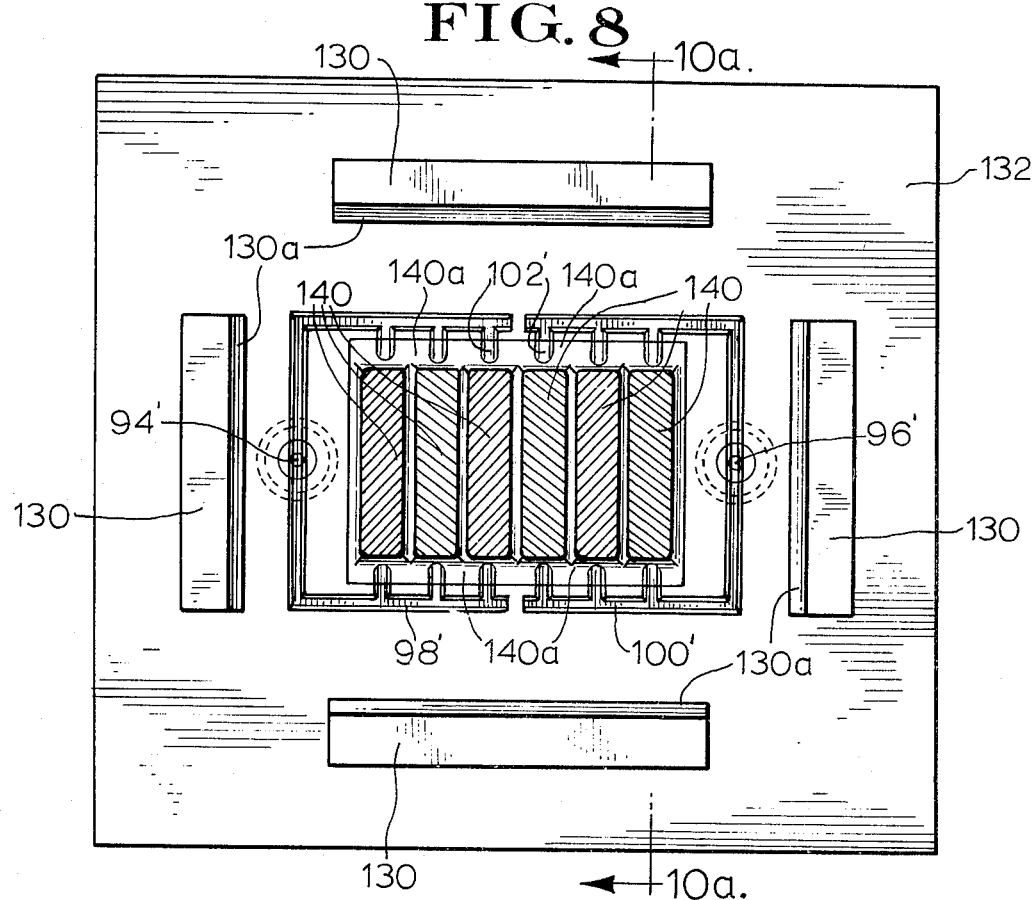
FIG. 8 is a view of one section of the mold structure taken along lines 8—8 of FIG. 6.

A similar set of four retaining blocks 130 arranged in a rectangular array (FIG. 8) are rigidly secured to a large support block 132 of the second mold means 106.

The sloped internal cam faces 130a of the blocks 130 engage the mating sloped faces of the sidewall members when the mold sections 104 and 106 moved into intimate engagement as seen in FIG. 7. The cooperative influence of the retaining block groups 127 and 130 in conjunction with the associated mating cam faces of the sidewall members 120-123 serve to retain the sidewalls in their proper position despite extreme outward forces encountered during injection of the thermoplastic material into the mold cavity.

The second mold means 106, as has already been seen, comprises a support block 132 to removably bolted platen 110.

Referring to FIG. 6, the support block 132 carries a plurality of laterally spaced core elements 140, the space between adjacent pairs of the cores corresponding to thickness to the partition walls of the container to be formed. The peripheral dimensions of cores 140 are smaller than the corresponding internal dimensions of sidewall members 120-123 by an amount equal to the peripheral wall thicknesses of container 80. For reasons presently to be explained, the outermost cores 140 are rigidly secured to block 132 while the inner cores 140 are normally biased in a leftward direction in the drawing, the extent of displacement of each inner core corresponding to the disparity in height between such inner core and the fixed outer cores. Specifically, each of the inner cores 140 is normally biased to a stop position under the influence of an associated spring 141. Counting from the topmost core of FIG. 6, cores two and four are biased equal distances while cores three and five are biased equal but lesser distances than cores two and four. Each of the inner cores includes a shoulder abutment on its opposite sides, one of said abutments 140a for each core being visible in FIG. 6 while both abutments for each inner core are visible in FIG. 8. The abutments 140a are intercepted by sidewall members 121 and 123 when the mold sections 104 and 106 are moved to their mated or closed positions thereby displacing the inner cores against the opposing force of their respective bias springs into positions of equal height alignment with the fixed outer cores. The base portions of the cores 140 situated within the block 132 are tapered, as seen in FIGS. 6 and 7, to prevent excessive scrubbing or binding of the cores 140 as they move relative to one another.

When the cores 140 are displaced to their equal height positions as seen in FIG. 7, the root portions of the cores cooperate to define a second transverse end wall of the mold cavity which is spaced from and parallel to the first transverse end wall defined by the face of base plate 125. The second transverse end wall corresponds to the open top of the container 80 to be formed. The transverse faces of the free ends of the cores 140 are provided with grooves 140b, as may only be seen in FIGS. 10b and 10d, to form the reinforcing ribs 90 of the container 80 (FIG. 5)

Again referring to FIG. 7, an understanding may be had of the gating means of the mold structure. The molten thermoplastic material such as polystyrene, cellulose acetate or polypropylene is introduced into the mold structure from the backside of the support block 132 through a primary inlet sprue 142. The inlet sprue 142 promptly divides into a pair of oppositely directed hot runner channels 144 and 146. The hot runner channels 144 and 146 initially extend parallel to the front face of the support block 132 and then at respective points beyond the outer limits of the mold cavity turn abruptly to extend toward the front face of the block 132 whereat they terminate in respective sprues 148 and 150. Conventional cartridge heater elements 134 and 136 surround the respective hot runner channels 144 and 146 to maintain the thermoplastic material therein in a molten condition.

Figure 7A:
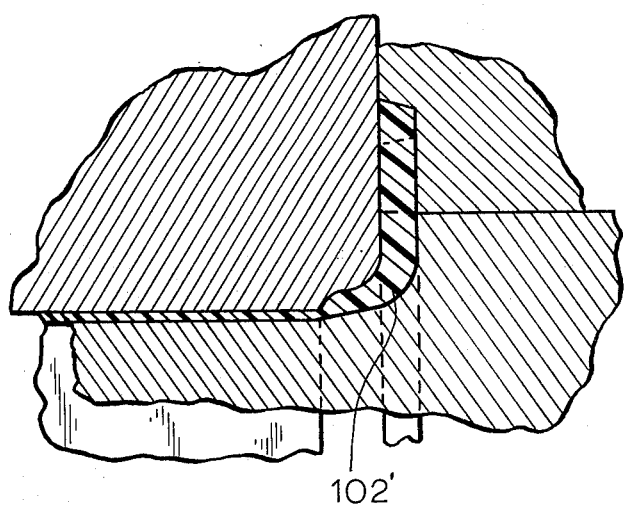
FIG. 7a is an exploded detail view depicting one of the inlet gates of the mold cavity.

The sprues 148 and 150 coupled to a cold runner means which in large measures are sculptured in the front face of the support block 132. The structure of the cold runner system may best be appreciated by momentary reference to FIG. 8 wherein cold runner channels are identified by the same reference numerals with the addition of primes as used to identify the cold runner waste material formed in these channels and illustrated in FIG. 5 by numerals 92, 98, 100 and 102. Specifically, the molten thermoplastic material from the sprues 148 and 150 enters the cold runner channel system at 94' and 96', respectively. A pair of similar and facing U-shaped cold runner channels 98' and 100' formed by grooved depressions in the surface of the front face of support block 132 are coupled at the mid-point of their respective base portions to an associated one of the vertical cold runner channels 94' and 96'. The thermoplastic material which flows in the cold runner channels 98' and 100' ultimately enters the mold cavity through inlet gate means comprising a plurality of inlet gate channels, an exemplary one of which 102' is identified in the drawing of FIG. 8. A portion of each inlet gate 102' lies in a common plane with the U-shaped channels 98' and 100' and is likewise defined by a grooved depression in the face of the block 132. However, as can be appreciated by momentary reference to FIG. 5, the inlet gate waste material 102 departs from the plane of the U-shaped cold runner waste material 98 and 100. Thus, in corresponding fashion, the remaining portion of the inlet gate channels 102' are formed by bores in the opposed mating surface of the sidewall members 120–123, as may be appreciated by reference to FIGS. 7 and 7a. The inlet gates 102' enters the mold cavity through comparatively small apertures and at points lying approximately in the plane of the open top of the container to be formed. It will be appreciated by those skilled in the art that the point of injection of the molten material into the mold cavity may vary somewhat below the open top without unduly complicating construction of the mold or detracting from the gating method of the present invention. The mold structure is depicted in FIG. 7 with the sections of the mold in their mated or closed position and with the thermoplastic material having been injected into the mold cavity to form a molded container therein.

The primary means for ejecting a molded container from the mold structure is partly visible in FIG. 7 and includes inwardly extending ledges 120e and 122e of the sidewall members 120 and 122, respectively. These ledges together with the corresponding ledge portions of the sidewall members 121 and 123 overlie the perimeter of the open top of the molded container 80 formed within the mold cavity. Divergent movement of the mold sections 104, 106 thus results in the container being stripped from the cores 140. The inner cores 140 also move toward their extended positions of FIG. 6 with divergent movement of the mold sections.

Further details of the structure of the first mold means may be appreciated by reference to FIG. 9. The sidewall members 120–123 are there shown in their open positions in which the corners of adjacent sidewalls have moved out of engagement with one another by a sufficient amount to release undercuts on the surface of the molded container thereby allowing the molded container to fall free of the mold. Assuming the sidewall members 120–123 were not displaced to their outward or open positions until the mold container is stripped completely from the core elements, it would be necessary for an operator to reach into the space between the four sidewalls on each operating cycle to withdraw the molded container. This procedure is obviated in accordance with the present invention and automated removal of the container from the mold assembly facilitated by provision of secondary ejector means supported by the first mold means 104. Specifically, the secondary ejector means comprises a pair of elements 156 mounted on each of the opposed sidewall members 120 and 122. Gripper fingers 156a extend through guide passages in their associated sidewall members and are selectively actuable in unison to grasp opposite sides of the container, as seen in FIG. 10a.

It is preferred that the sidewall members 120–123 remain in their closed positions during the major portion of the separating movement between the first and second mold means thereby permitting the internal ledges on each of these sidewall members to strip the molded container from the cores 140. However, once the container has been stripped from the major length of the cores 140, the sidewall members 120–123 are displaced to their open or laterally separated position (FIGS. 6 and 9) and the gripper fingers 156a are actuated to grasp the container adjacent its bottom wall and to complete the stripping procedure, as again seen in FIG. 10a.

The mode of operation of the secondary ejector means and certain further features of the invention may best be appreciated by reference to FIGS. 10a-d. Referring first to FIG. 10a, the gripper fingers 156a of the secondary ejector means 156 are shown gripping an exemplary molded container 80' near its bottom wall. The mold sections have separated sufficiently such that the casing 80' is entirely clear of the core members 140. The secondary ejector means 156 are at this point deenergized causing the fingers 156a to release the casing 80' so that it falls freely from the mold. A conveyor or the like beneath the mold may be provided for automatic handling of the ejected containers. Additionally, means may be provided on the mold structure for automatically severing the cold runner waste material 92 from the container.

The details of the mechanism for displacing the sidewall members 121, 120–123 between their open and closed positions is best seen in FIGS. 10a-10c. The face of each sidewall member positioned in opposed relation to the face of base plate 125 is provided with a bore of a T-shaped cross-section for loosely journaling the head of a similarly configured push rod 160. The push rods 160 have elongated shaft portions that are journaled in respective bores of plate 125. The push rods are operative to displace an associated sidewall between its open and closed positions. In order to assure that the sidewalls move in unison and that their outward travel is limited, the remaining end of the push rods is threadably secured to an actuator plate 162. The actuator plate 162 is selectively actuable by a conventional hydraulic piston and cylinder arrangements 161 and 163 (FIG. 7) for movement between an open position illustrated in FIG. 10a in which the actuator plate 162 is adjacent the backside of base plate 125 and a closed position illustrated in FIG. 7 in which the actuator plate is adjacent the second base plate 126 and sidewall members 120–123 firmly contact the face of base plate 125. The actuator plate is apertured so as not to interfere with spacers 125a and moves between its spaced positions along guide posts 165 secured to the second base plate 126.

Referring now to FIGS. 10b and 10d, a further feature of the invention is illustrated. Specifically, it is desirable in certain instances to provide further assistance in the ejecting of the container from the mold. To this end, there is provided a passageway 162 extending from the back portion of the second mold means 106 through the length of one or more of the core members and opening into the mold cavity through one or more valve structures 164 at the transverse top of one or more of the core elements 140. Air under high pressure is introduced into the mold cavity through the passageway 162 and the valve structure 164 during the ejection procedure so as to develop a pneumatic force tending to displace the molded container from the cores.

The valve structure 164 as seen in FIG. 10d is of a conventional tappet type construction having a tapered head which seats flush with the top surface of the core element. Valve 164 is normally maintained in its closed position under the influence of a bias spring 164a. The valve 164 opens against the bias of spring 164a in the presence of a sufficiently high air pressure within passageway 162.

In accordance with the present invention, the valve structure 164 is constructed to perform an additional and important function during each molding cycle. Specifically, as thermoplastic material is injected into the mold cavity under high pressure it is necessary that air within the cavity be permitted to escape or that a vacuum be drawn within the cavity. To this end, a flat 164b is ground on one side of the valve structure 164 to provide a very small opening from the passageway 162 into the mold cavity even when the valve 164 is closed. During the injection portion of the operating cycle a vacuum pump is connected to the passageway 162 to thereby draw vacuum within the mold cavity. The flat 164b creates a sufficiently small opening such that thermoplastic material is not drawn into the passageway 162.

As an alternative or supplement to the value structure 164, inlet channel means may be provided about the perimeter of the mold cavity, preferably adjacent the closed end of the container to be formed for drawing a vacuum upon introduction of the thermoplastic material into the cavity. A pair of such inlet channels 166 are illustrated in FIG. 10a; the channels are also visible in FIG. 7. Typically, as many as six or eight such channels may be provided at spaced intervals about the perimeter of the mold cavity. Each inlet channel includes a first passageway portion formed internally of the block 125 and leading to an external vacuum pump system (not shown) and a second connecting passageway portion formed between the interface of the sidewall members 120 and the mating face portion of the block 125. To this end, one or the other or both of the surfaces of the block 125 or the sidewall members 120 are grooved to form passageway opening into the mold cavity at a location corresponding to the bottom wall of the container 80 to be formed. The size of the openings into the mold cavity are, of course, sufficiently small so that thermoplastic material is not drawn into the passages.

The overall operation of the mold structure and method of the present invention may be appreciated by referring initially to FIG. 6. The first and second mold means 104 and 106 are there shown in their separated or open condition at the conclusion of an operating cycle with a molded container 80 having been released from both sections of the mold so as to fall to a receiving table or conveyor (not shown). The platen 108 in the present structure remains stationary and the platen 107 commences its return movement to initiate a succeeding operating cycle. The mold section 104 is guided toward a proper mating relationship with the opposed mold section 106 by the guide pin and bore arrangement 112, 118 and 114, 116. The hydraulic cylinders 161 and 163 are also actuated before or during the course of such return movement to displace the actuator plate 162 and thus correspondingly displace sidewalls 120–123 from their open position shown in FIG. 6 to a closed position as shown in FIG. 7.

The mold platen 108 is shown having completed its return movement in FIG. 7 and with the exemplary sidewalls 120 and 122 securely locked into place by the retaining block sets 127 and 130. The other sidewalls 121 and 123 are similarly secured. A vacuum may now be drawn in the mold cavity by a vacuum pump (not shown) coupled to the cavity through the passage way 162 and valve structure 164 (FIGS. 10b and 10dD. The molten thermoplastic material is concurrently injected into the mold structure through the primary inlet sprue 142. As previously explained, the molten thermoplastic material flows through the bifurcated hot runner channels 144, 146 where it is permanently maintained in a melted condition by the cartridge type heaters 134, 136 to the sprues 148 and 150. The material continues its flow path through the respective U-shaped cold runner system 98' and 100' (FIG. 8) and then through the various inlet gates 102' and into the mold cavity. The concurrent introduction of the thermoplastic material on opposite sides of the cores and intermediate adjacent partition walls tends to prevent the cores 140 from "whipping," i.e., being biased from a true center position by differential pressure on opposite sides of the core. Such "whipping" results in undesired nonuniformity in thickness of the partition walls of the container. Most significantly, however, with the material entering the cavity at the secured ends of the cantilevered cores, it has been found that there is less tendency for hydraulic imbalance to occur on opposite sides of the cores than in prior art structures. This appears attributable to the fact that before the thermoplastic material flows to the free end of the cores the space at the fixed ends has already been filled thereby tending to preclude core displacement.

Once the injection cycle is complete, and the thermoplastic material has solidified, the mold platen 107 is again actuated to move in its reverse direction and with the internal ledges of the exemplary sidewalls 120 and 122 as well as the remaining sidewalls not visible in FIG. 7, engaging the outer perimeter of the open top of the molded container 80 to strip the container from the core members 140. All of the inner cores initially move with the sidewalls 120–123 so that there is initially only relative movement and thus stripping of the container from the outermost cores 140. After a short distance, the third and fifth cores reach their stop abutments and stripping is initiated from these cores. In a further distance the second and fourth cores intercept steps and stripping is now initiated as to these cores. This progressive stripping of the molded container from the core elements facilitates the ejection process. However, all of cores 140 may be fixedly secured to the support block 132 where the advantages of progressively stripping are not required.

The passageway 162 (FIG. 10b) is connected to an air pressure source during the ejection procedure so that pressurized air is introduced into the mold cavity through valves 164. The pressurized air aids in the ejection process but may be omitted in those environments where such refinement is unnecessary to satisfactory operation of the mold.

After the platen 107 has moved sufficiently away from fixed platen 108 so that the major portion of the casing 80 has been stripped from the cores 140, the pressure plate 162 is actuated to displace the sidewalls 120–123 outwardly to their open positions.

The sidewalls 120–123 are illustrated in their open positions in FIG. 10a and with the secondary ejector means 156 having just been actuated so that the gripper fingers engage the end portion of the casing and complete removal of the casing from the cores 140. The secondary ejector means 156 may now be deenergized and the casing 80 will fall from the mold onto a receiving conveyor or the like. The mold structure is again ready to repeat the operating sequence described.

The various time sequential operations described in running the mold through a complete operating cycle such as hydraulic motors 161, 163 and ejectors 156 are controlled from conventional electrical, mechanical and hydraulic control apparatus well known to those skilled in the art. For example, various adjustable microswitches may be positioned in the path of travel of the mold platen 107 so as to be operated at various positional locations of the mold structure. Accordingly, this well-known apparatus need not be explained in further detail.

While particular embodients of the present invention have been shown and described, it is apparent that various changes and modifications may be made, and it is therefore intended in the following claims to cover all such modifications and changes as may fall within the true spirit and scope of this invention.

The embodiment of the invention in which an exclusive property or privilege is claimed are defined as follows:

1. A method of manufacturing a container of a rectangular, box-like configuration having a closed bottom wall and an open top and further having a plurality of partition walls extending between spaced container side walls and dividing said container into a plurality of adjacent cells with the width of each cell being substantially greater than the thickness of each partition wall and with the height of each cell between the closed bottom wall and open top being substantially greater than the width of said cell, said method comprising the steps of:

defining between a pair of separable mold members a mold cavity corresponding in configuration to said container, a first of said mold members comprising four side wall elements cooperatively defining in a first position a hollow rectangular cavity corresponding to the exterior dimensions of said container but movable to a second position in which said side wall members are displaced laterally outward of said first position for releasing a molded container, and the second of said mold members including a plurality of laterally spaced cantilevered core members having their respective fixed end portions secured to said second mold member and their free end portions removably positionable in said rectangular cavity to define in conjunction therewith said mold cavity, each of said core members being of a height substantially greater than its thickness and a thickness substantially greater than the lateral spacing between said core members;

injecting thermoplastic material into said first mold member through a primary inlet sprue;

communicating said thermoplastic material from said primary inlet sprue through a plurality of cold runner channel means formed between contiguous ones of said four side wall elements to a plane adjacent the fixed ends of said cantilevered core elements; and introducing thermoplastic material into said mold cavity through a plurality of inlet gates coupled to said cold runner means and disposed at spaced intervals about the periphery of said mold cavity at approximately the parting line of said pair of separable mold members adjacent to the fixed ends of said cantilevered core members.

2. The gating method of claim 1 in which said communicating step comprises directing said thermoplastic material from said primary inlet sprue through a plurality of separate hot runner channels constituting said hot runner means and with each hot runner channel communicating with a separate cold runner channel of said cold runner means, each of said separate channels of said cold runner means communicating in turn with a plurality of said inlet gates.

3. The gating method of claim 2 in which said introducing step includes locating one inlet gate to open into said mold cavity intermediate each adjacent pair of partition walls on each sidewall of said container.

4. The gating method of claim 3 in which said injecting step comprises injecting said thermoplastic material into said mold structure at a position adjacent said closed bottom of said container and remote from said open top and further in which said communicating step comprises directing said thermoplastic material from said primary inlet sprue through four similar hot runner channels coupled to individual cold runner channels extending from that portion of said mold cavity corresponding to the bottom of said container to that portion corresponding to the open top and each of said cold runner channels positioned adjacent a respective corner of the rectangular mold cavity.

5. The gating method of claim 4 in which said communicating step further comprises directing said thermoplastic material through respective extensions of said cold runner channels which extensions lie approximately in said common plane and communicate with a plurality of said inlet gates.

6. The gating method of claim 3 in which said injecting step comprises injecting said thermoplastic material into said mold structure at a position adjacent said open top of said container and remote from said closed bottom and further in which said communicating step comprises directing said thermoplastic material from said primary inlet sprue through a pair of hot runner channels each coupled to individual cold runner channels lying approximately in said common plane.

7. The gating method of claim 6 in which said communicating step includes directing said thermoplastic material from each of said hot runner channels into respective ones of a pair of symmetrical cold runner channels of U-shaped configuration with inlet gates being disposed at regularly spaced intervals along each leg of each U and with said hot runner channels communicating with its associated U-shaped cold runner channel along the base of said U.

8. A method of manufacturing a container of a rectangular, box-like configuration having a closed bottom wall and an open top and further having a plurality of partition walls extending between spaced container side walls and dividing said container into a plurality of adjacent cells with the width of each cell being substantially greater than the thickness of each partition wall and with the height of each cell between the closed bottom wall and open top being substantially greater than the width of said cell, said method comprising the steps of:

defining between a pair of separable mold members a mold cavity corresponding in configuration to said container, a first of said mold members comprising four side wall elements cooperatively defining in a first position a hollow rectangular cavity corresponding to the exterior dimensions of said container but movable to a second position in which said side wall members are displaced laterally outward of said first position for releasing a molded container, and the second of said mold members including a plurality of laterally spaced cantilevered core members having their respective fixed end portions secured to said second mold member and their free end portions removably positionable in said rectangular cavity to define in conjunction therewith said mold cavity, each of said core members being of height substantially greater than its thickness and a thickness substantially greater than the lateral spacing between said core members:

injecting thermoplastic material into said second mold member through a primary inlet sprue;

communicating said thermoplastic material to cold runner channel means through hot runner channel means coupled to said inlet sprue and located entirely within said second mold member; and introducing thermoplastic material into said mold cavity through a plurality of inlet gates coupled to said cold runner means and disposed at spaced intervals about the periphery of said mold cavity at approximately the parting line of said pair of separable mold members adjacent to the fixed ends of said cantilevered core members.

9. The method of manufacture of claim 8 and further including the step of ejecting said container from the mold structure by moving said mold members away from one another so as to effectively withdraw said cores from said rectangular cavity and positioning an inwardly extending peripheral ledge of said first mold member to engage the perimeter of the open top of said container during such movement to strip said container from said cores of said second mold member.

10. The method of manufacture of claim 9 in which said ejecting step further includes displacing said peripheral ledge away from engagement with the top of said container upon relative outward movement of said first and second mold members a predetermined distance.

11. The method of manufacture of claim 10 in which said ejecting step further includes actuating secondary ejection means upon displacement of said peripheral ledge away from the top of said container for completing the ejection of the container.

12. The method of manufacture of claim 11 in which said actuating step comprises actuating gripper means positioned on said first mold member for engaging said container upon said displacement of said peripheral ledge to complete the stripping of the casing from the cores of said second mold member.

13. The method of manufacture of claim 12 and further including the step of drawing a vacuum in said mold cavity upon introduction of said thermoplastic material therein and drawing such vacuum through a passageway opening into said mold cavity at the transverse top surface of at least one of said core members corresponding to the internal bottom wall of said container.

14. The method of manufacture of claim 13 and further including pumping air through said passageway upon ejecting of said container to assist in the ejecting step.

15. The method of manufacture of claim 14 and further including the step of drawing a vacuum in said mold cavity upon introduction of said thermoplastic material therein and drawing such vacuum through at least one passageway opening into said mold cavity at a location about the perimeter thereof and adjacent the end of said mold cavity corresponding to the closed bottom wall thereof.

* * * * *